United States Patent [19]
Kowshik et al.

[11] Patent Number: 5,907,484
[45] Date of Patent: *May 25, 1999

[54] CHARGE PUMP

[75] Inventors: Vikram Kowshik, San Jose; Andy Teng-Feng Yu, Palo Alto, both of Calif.

[73] Assignee: Programmable Microelectronics Corp., San Jose, Calif.

[ * ] Notice: This patent is subject to a terminal disclaimer.

[21] Appl. No.: 08/918,744

[22] Filed: Aug. 25, 1997

Related U.S. Application Data

[63] Continuation of application No. 08/652,866, May 23, 1996, abandoned, which is a continuation-in-part of application No. 08/639,280, Apr. 25, 1996, Pat. No. 5,625,544.

[51] Int. Cl.⁶ .................................................. H02M 3/18
[52] U.S. Cl. .............................. 363/60; 307/110; 327/536
[58] Field of Search ................................. 363/59, 60, 61; 307/110; 327/536

[56] References Cited

U.S. PATENT DOCUMENTS

| | | | |
|---|---|---|---|
| 5,036,229 | 7/1991 | Tran | 307/497 |
| 5,191,232 | 3/1993 | Wang | 307/264 |
| 5,216,588 | 6/1993 | Bajwa et al. | 363/60 |
| 5,280,420 | 1/1994 | Rapp | 363/60 |
| 5,301,097 | 4/1994 | McDaniel | 363/60 |
| 5,329,143 | 7/1994 | Chan et al. | 257/173 |
| 5,398,001 | 3/1995 | Karl | 327/258 |
| 5,436,587 | 7/1995 | Cernea | 327/536 |
| 5,483,434 | 1/1996 | Seesink | 363/60 |
| 5,559,687 | 9/1996 | Nicollini et al. | 363/60 |

FOREIGN PATENT DOCUMENTS

| | | |
|---|---|---|
| 0 382 929 | 8/1990 | European Pat. Off. . |
| 0 466 532 | 1/1992 | European Pat. Off. . |
| 2 220 811 | 1/1990 | United Kingdom . |

OTHER PUBLICATIONS

Toru Tanzawa, et al.: "A Quick Boosting Charge Pump Circuit for High Density and Low Voltage Flash Memories", Symposium on VLSI Circuits, Digest of Technical Papers, Honolulu, Jun. 9–11, 1994. Jun. 9, 1994, IEEE, pp. 65/66, XP000501024.

*Primary Examiner*—Shawn Riley
*Attorney, Agent, or Firm*—Skjerven, Morrill, MacPherson, Franklyn & Friel LLP; Alan H. MacPherson

[57] ABSTRACT

A charge pump circuit including N stages of diode-capacitor voltage multipliers clocked so as to convert a low voltage received from a supply voltage to a high voltage at an output terminal thereof employs an output stage to improve the efficiency of the charge pump. The output stage includes first and second legs each coupled to the output terminal, where the first leg provides current to the output terminal during low transitions of the clock signal and the second leg provides current to the output terminal during high transitions of the clock signal. In some embodiments, numerous ones of the above-mentioned charge pump circuit may be connected in parallel to achieve even greater output currents. Thus, unlike conventional charge pump circuits, a substantially constant current is provided to the output terminal throughout each period of the clock signal, thereby increasing the average total current provided to the output terminal and, thus, increasing the driving capability of the charge pump circuit.

20 Claims, 7 Drawing Sheets

CHARGE PUMP

CROSS REFERENCES

This application is a continuation of patent application Ser. No. 08/652,866, filed May 23, 1996, since abandoned, which was a continuation-in-part of patent application Ser. No. 08/639,280, filed Apr. 25, 1996, now U.S. Pat. No. 5,625,544.

BACKGROUND

1. Field of the Invention

The present invention relates to power converters and more specifically to high efficiency charge pump circuits.

2. Description of Related Art

Charge pump circuits are often required within integrated circuit's (IC's) to convert a low voltage to a high voltage. Typically, such charge pump circuits employ a series of clocked diode-capacitor voltage multiplier circuits, as shown in FIG. 1. Such charge pump circuits generate only a small amount of output current, typically less than 100 $\mu$A, thereby limiting their driving ability. Increasing the size of the capacitors to provide a greater output current not only undesirably increases the size of the charge pump circuit but also may lead to increased noise.

The output voltage $V_{PP}$ of charge pump circuit 100 is a function of the input power supply, the number of pump stages, the clock frequency, and the load current at the output terminal. This relationship may be expressed as:

$$V_{out} = V_{CC} - N\left[\left(\frac{C}{C+C_s}\right)V_{CC} - V_{PN}\right] - V_{PN} - \frac{NI_{out}}{(C+C_s)f_e}$$

where $V_{CC}$ is the power supply, N is the number of pump stages, $V_{PN}$ is the forward voltage drop across each of diodes $D_1$–$D_N$, $I_{out}$ is the load current, $f_e$ is the effective clock frequency, and $C_s$ is the parasitic capacitance at each of the clocked nodes along the diode chain.

In U.S. Pat. No. 5,216,588, Bajwa et al disclose a charge pump circuit which may increase output current to approximately 8 mA by providing a plurality of parallel-connected diode-capacitor voltage multiplier circuits. The plurality of voltage multiplier circuits are switched at different times during the clock frequency to minimize noise generation. Although improving performance over more conventional charge pump circuits, the greater output current is realized by the addition of parallel diode-capacitor voltage multipliers, thereby significantly increasing the size and complexity of the charge pump.

It would thus be advantageous for a charge pump circuit to provide a greater current driving capability without significantly increasing the size of the charge pump circuit.

SUMMARY

In accordance with the present invention, a charge pump circuit including N stages of diode-capacitor voltage multipliers clocked so as to convert a low voltage to a high voltage employs an output stage to improve the efficiency of the charge pump. The output stage includes first and second legs each coupled to an output terminal from the charge pump circuit, where the first leg provides current to the output terminal during low transitions of the clock signal and the second stage provides current to the output terminal during high transitions of the clock signal. Thus, unlike conventional charge pump circuits, a substantially constant current is provided to the output terminal throughout the period of the clock signal, thereby increasing the average total current provided to the output terminal and, thus, increasing the driving capability of the charge pump circuit. In some embodiments, a plurality of the above-mentioned charge pump circuits may be connected in parallel to achieve even greater output currents.

DETAILED DESCRIPTION

The following includes a detailed description of several embodiments for implementing the present invention. Accordingly, the description below is intended to be merely illustrative and should not be construed in a limiting manner.

Figure 2:
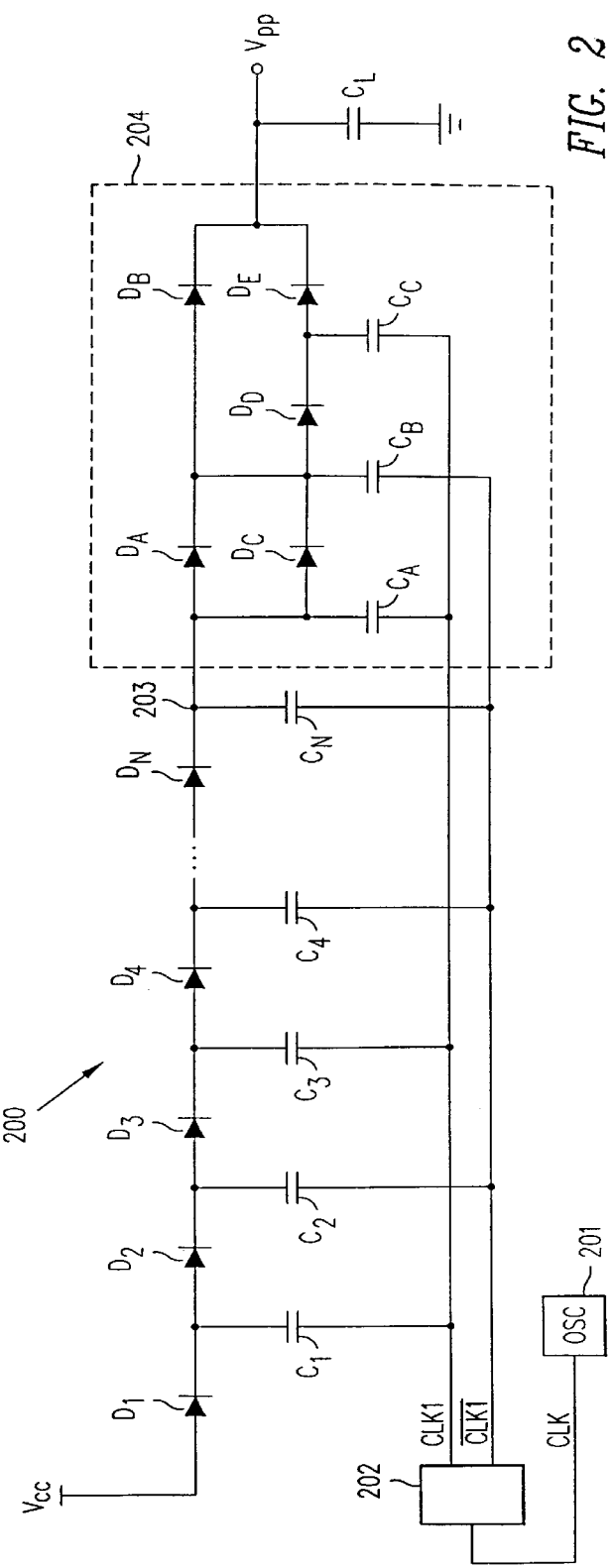
FIGS. 2 and 2A are schematic diagrams of charge pump circuits in accordance with one embodiment of the present invention.
Figure 4:
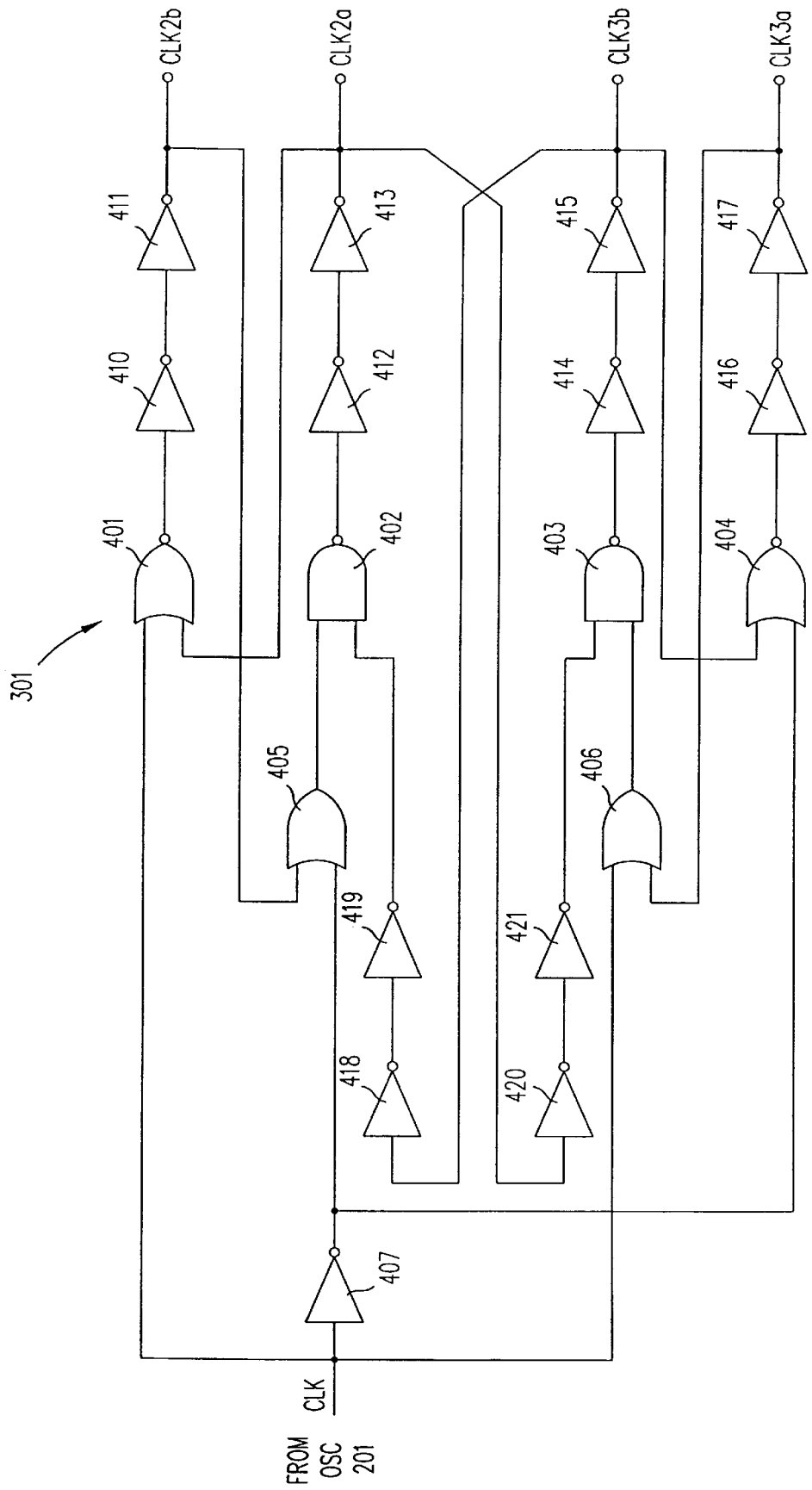
FIG. 4 is a schematic diagram of a clock control circuit employed in the embodiment of FIGS. 3 and 3A.
Figure 5:
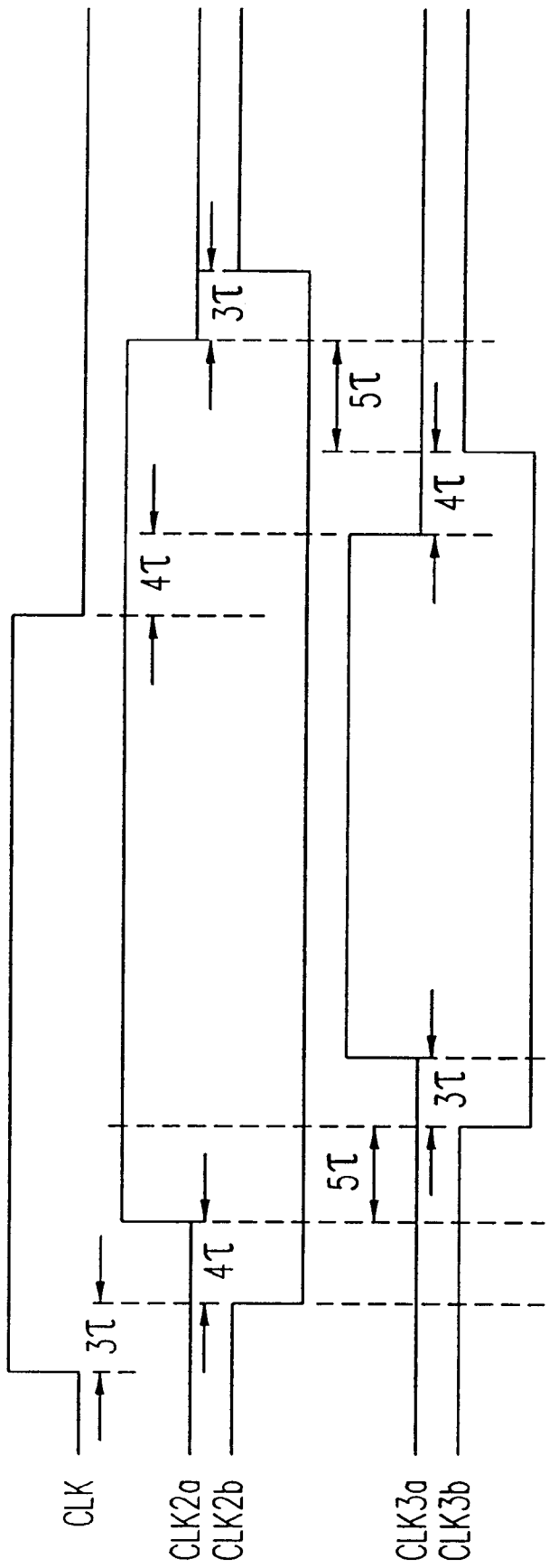
FIG. 5 is a timing diagram of clocking signals used in the embodiment of FIGS. 3 and 3A.

Referring now to FIG. 2, a high-efficiency charge pump circuit 200 includes an oscillator 201 of conventional design which provides a clock signal CLK having a frequency f to a clock control circuit 202. In response to clock signal CLK, control circuit 202 generates a clock signal CLK1 and an inverted clock signal $\overline{\text{CLK1}}$ in a well known manner. Preferably, CLK1 and its complementary clock signal $\overline{\text{CLK1}}$ are non-overlapping during high transitions, i.e., CLK1 and $\overline{\text{CLK1}}$ are never simultaneously high. If clock signals CLK1 and $\overline{\text{CLK1}}$ were ever simultaneously high, some of the diode-capacitor voltage multipliers discussed below would not fully charge, thereby undesirably limiting operation of the charge pump circuits disclosed herein. In some embodiments, charge pumps in accordance with that shown in FIG. 2 may operate using clock signals CLK1 and $\overline{\text{CLK1}}$ which, as explained below, are generated by a clock control circuit 301 as illustrated in FIGS. 4 and 5.

Charge pump circuit 200 further includes an output terminal $V_{PP}$ having a capacitive load attached thereto, as shown by capacitor $C_L$, and N stages of series connected diode-capacitor voltage multipliers $D_i$, $C_i$, where i is an integer given by $1 \leq i \leq N$. Alternate ones of the diode-capacitor stages are connected to the leads carrying clock signals CLK1 and $\overline{\text{CLK1}}$ via bootstrap capacitors C, as shown in FIG. 2. That is, all odd numbered diode-capacitor pairs are coupled to receive clock signal CLK1 and all even numbered diode-capacitor pairs are coupled to receive clock signal $\overline{\text{CLK1}}$. In this manner, successive diode-capacitor stages are charged on the high transitions of clock signals CLK1 and $\overline{\text{CLK1}}$ to produce a multiplied voltage at node 203 equal to approximately $$NV_{CC} - NV_{BE},$$

where N is the number of diode-capacitor stages, $V_{CC}$ is the supply voltage, and $V_{BE}$ is the voltage drop across each of diodes $D_1$–$D_N$.

An output stage 204 including diodes $D_A$, $D_B$, $D_C$, $D_D$, and $D_E$ and capacitors $C_A$, $C_B$, and $C_C$ is coupled between the Nth diode-capacitor voltage multiplier stage and output terminal $V_{PP}$, as shown in FIG. 2. Output stage 204 increases the efficiency of charge pump circuit 200 by ensuring that current flows to and thus charges output terminal $V_{PP}$ continuously during both high and low transitions of clock signal CLK1. The net effect of output stage 204 is that the effective clock frequency $f_e$ of charge pump circuit 200, and hence the output current provided to output terminal $V_{PP}$, is increased by a factor of approximately 2. Accordingly, the efficiency of charge pump 200 is increased.

When CLK1 transitions high, the respective anodes of diodes $D_A$ and $D_C$ are bootstrapped to higher potentials proportional to the amplitude of the clock phase, thereby forcing current to flow through diodes $D_A$ and $D_C$ and, as a result, charging capacitor $C_B$. When $\overline{CLK1}$ transitions high, the respective anodes of diodes $D_B$ and $D_D$ are bootstrapped to a higher potential. As a result, diode $D_B$ delivers current to the load $C_L$ at output terminal $V_{PP}$ while diode $D_D$ delivers current to, and thus charges, capacitor $C_C$. The next high transition of CLK1 bootstraps the anode of diode $D_E$ to a higher potential via capacitor $C_C$. As a result, diode $D_E$ delivers current to the load $C_L$ at output terminal $V_{PP}$. This high transition of CLK1 also charges capacitor $C_B$ by bootstrapping the respective anodes of diodes $D_A$ and $D_C$ to a higher potential via capacitor $C_A$, as described earlier. Note that in other embodiments parallel-connected diodes $D_A$ and $D_C$ may be implemented as a single diode element.

Figure 1:
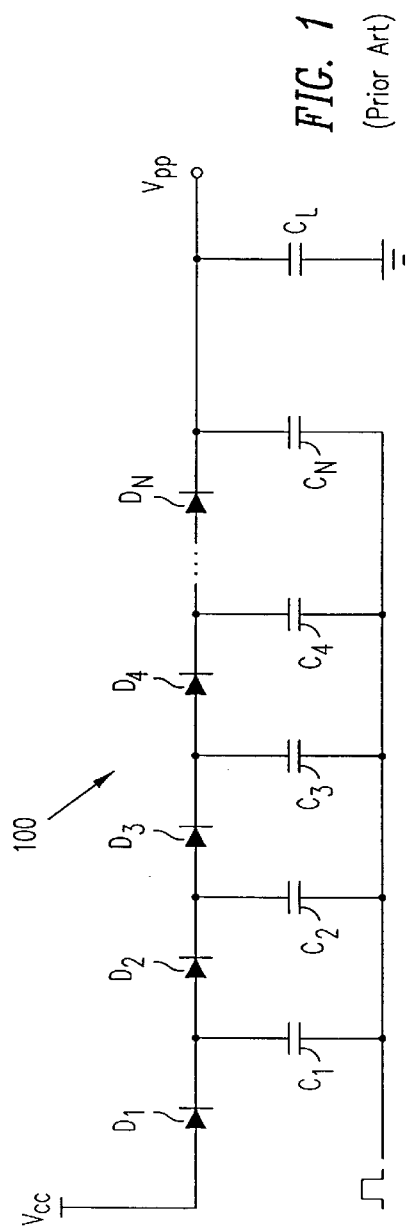
FIG. 1 is a schematic diagram of a conventional charge pump circuit.
Figure 3:
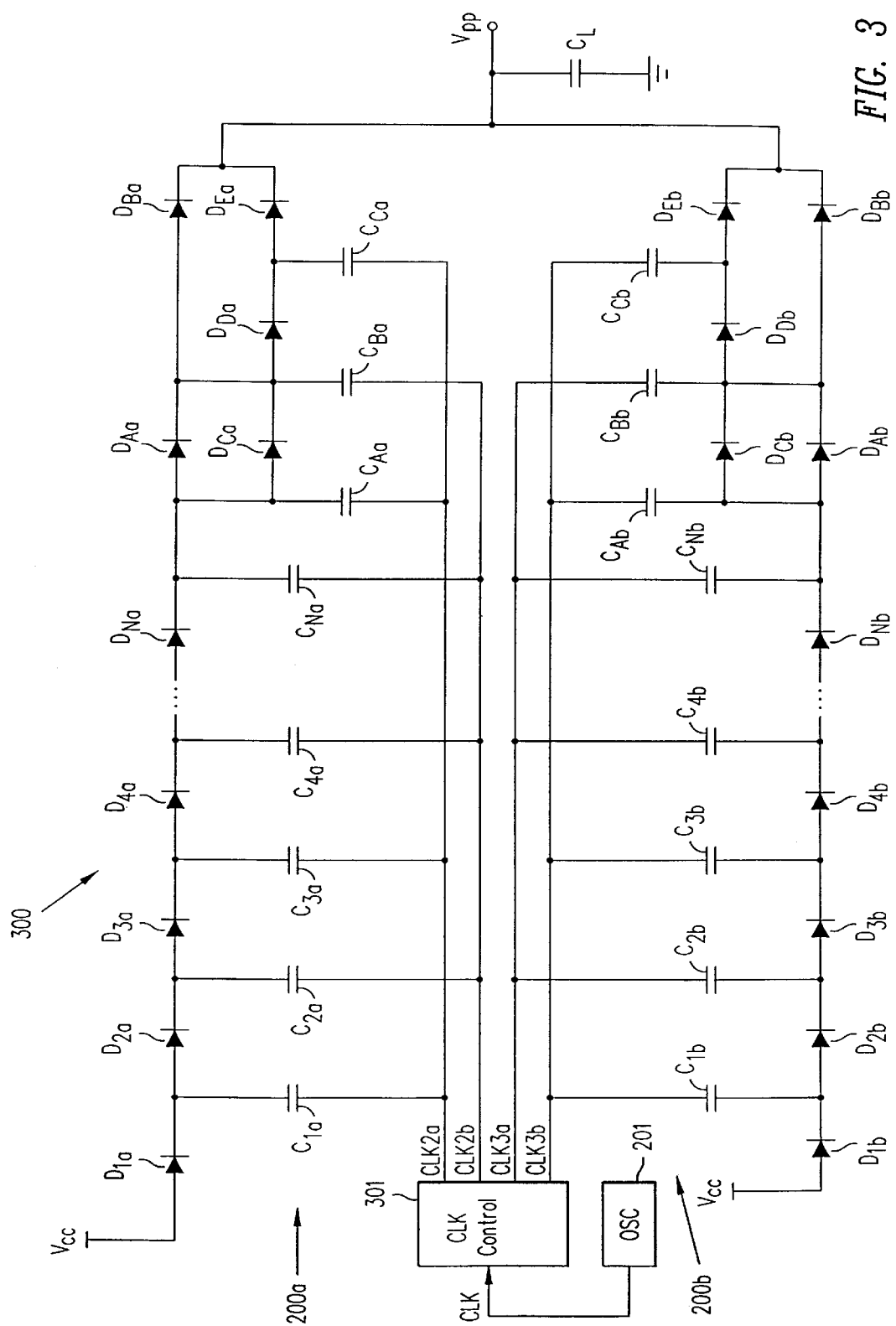
FIGS. 3 and 3A are schematic diagrams of charge pump circuits in accordance with another embodiment of the present invention.

In this manner, diodes $D_B$ and $D_E$ provide current to output terminal $V_{PP}$ on high transitions of complementary clock signals $\overline{CLK1}$ and CLK1, respectively. Thus, charge pump circuit 200 provides a substantially constant current flow to output terminal $V_{PP}$ during the entire period of the clock signal CLK1, i.e., during both low and high transitions of clock signal CLK1, thereby increasing the effective frequency $f_e$ of charge pump 200. In contrast, conventional charge pump circuits such as circuit 100 of FIG. 1 provide current to their respective output terminals in response to only the positive-going transitions of the clock signal CLK and, thus, charge the output only during approximately one-half the duty cycle of the clock signal CLK. Accordingly, by utilizing the entire period of the clock signal CLK1, charge pump circuit 200 is capable of providing a higher average current flow to output terminal $V_{PP}$ with only a minimal increase in circuit size.

Where it is desired to generate even greater currents to output terminal $V_{PP}$, a plurality of circuits 200 may be connected in parallel, where each of circuits 200 receives its own clock signal and an associated high-transition non-overlapping clock signal. For example, FIG. 3 shows a charge pump circuit 300 including two charge pump circuits 200a and 200b, where circuits 200a and 200b are each substantially identical in structure and operation to circuit 200 as described above and illustrated in FIG. 2. Accordingly, those components common to the embodiments of FIGS. 2 and 3 are similarly labelled.

Oscillator 201 provides a clock signal CLK having a frequency f to a clock control circuit 301 which, in turn, provides clock signals CLK2a and CLK2b to circuit 200a and provides clock signals CLK3a and CLK3b to circuit 200b. Preferably, clock signals CLK2a and CLK2b are non-overlapping during high transitions, and clock signals CLK3a and CLK3b are non-overlapping during high transitions, as discussed below with reference to FIGS. 4 and 5.

In a manner similar to that described above with respect to circuit 200 (FIG. 2), alternate stages of charge pump circuit 200a are coupled to respective clock signals CLK2a and CLK2b via associated ones of bootstrap capacitors $C_{1a}$–$C_{Na}$, while alternate stages of charge pump circuit 200b are coupled to respective clock signals CLK3a and CLK3b via associated ones of bootstrap capacitors $C_{1b}$–$C_{Nb}$. Thus, charge pump circuit 300, in addition to achieving all of the advantages of circuit 200, may output to $V_{PP}$ twice the current provided by circuit 200. In one embodiment, where $V_{CC}$ is equal to approximately V and capacitors $C_{1a}$–$C_{Na}$ and $C_{1b}$–$C_{Nb}$ are each 5.5 pF and where capacitors $C_{Aa}$–$C_{Ca}$ and $C_{Ab}$–$C_{Cb}$ are each 5.5 pF, circuit 300 is capable of providing approximately 900 μA at approximately 10 V to output terminal $V_{PP}$.

FIG. 4 shows one implementation of clock circuit 301 which results in the generation of the clock signals CLK2a, CLK2b, CLK3a, and CLK3b from a raw clock signal CLK provided by oscillator 201, as depicted in the timing diagram of FIG. 5. In the discussion that follows, oscillator raw clock signal CLK is initially at a logic low level, while clock signals CLK2a and CLK3a are initially at a logic low level and clock signals CLK2b and CLK3b are initially at a logic high level. For simplicity each of the logic gates shown in FIG. 4 has associated therewith a gate delay τ. Note that although delay elements are discussed below and shown in FIG. 4 as conventional inverters, delay elements may in other embodiments comprise any suitable delay means.

When raw clock signal CLK transitions high, the signal associated with output terminal of NOR gate 401 is forced low, thereby forcing clock signal CLK2b low. NOR gate 401, together with inverters 410 and 411, provide a delay of approximately 3τ between the low-to-high transition of signal CLK and the high-to-low transition of signal CLK2b. The logic low level of signal CLK2b appears at one input terminal of OR gate 405. Raw clock signal CLK is inverted by inverter 407 and appears at the other input terminal of OR gate 405, thereby forcing the signal at the output terminal of OR gate 405 low which, in turn, forces the signal at the output terminal of NAND gate 402 high. In this manner, clock signal CLK2a is forced high (via gates 405, 402, 412, and 413) approximately 4τ after clock CLK2b transitions low. Recalling that raw clock signal CLK is still high, the logic high level of clock signal CLK2a forces the signal at the output terminal of NAND gate 403 low. In this manner, clock signal CLK3b transitions low (via gates 420, 421, 403, 414, and 415) approximately 5τ after clock signal CLK2a transitions from low to high. This logic low level of clock signal CLK3b forces the signal at the output terminal of NOR gate 404 high, thereby forcing clock signal CLK3a high (via gates 404, 416 and 417) approximately 3τ after clock signal CLK3b transitions from high to low.

When raw clock signal CLK transitions from high to low, the logic high signal output from inverter 407 forces the signal at the output terminal of NOR gate 404 low, thereby forcing clock signal CLK3a low (via gates 407, 404, 416, and 417) approximately 4τ after raw clock signal CLK transitions low. Since raw clock signal CLK is low, the logic low level of clock signal CLK3a passes through OR gate 406 and forces the signal at the output terminal of NAND gate 403 high. In this manner, clock signal CLK3b transitions from low to high (via gates 406, 403, 414, and 415) approximately 4τ after clock signal CLK3a transitions from high to low. This logic high level of clock signal CLK3b appears at one input terminal of NAND gate 402. The other input terminal of NAND gate 402 is driven high by inverter 407 (recall that raw clock signal is low), thereby forcing the signal at the output terminal of NAND gate 402 low. Thus, clock signal CLK2a transitions from high to low (via gates 418, 419, 402, 412, and 413) approximately 5τ after clock signal CLK3b transitions from low to high. The logic low level of clock signal CLK2a, in turn, forces clock signal CLK2b high (via gates 401, 410, and 411) approximately 3τ after clock signal CLK2a transitions low. Thus, referring again to FIG. 5, clock signals CLK2a and CLK2b never overlap high, i.e., they are never simultaneously high, and clock signals CLK3a and CLK3b never overlap high.

This non-overlapping high feature of these clock signals prevents voltage feedthrough between successive diode-capacitor multiplier stages of the present embodiments. Without such a feature, adjacent ones of the diode-capacitor multiplier stages may simultaneously discharge, thereby preventing maximum charging of some of the stages and, thus, degrading efficiency.

Figure 2A:
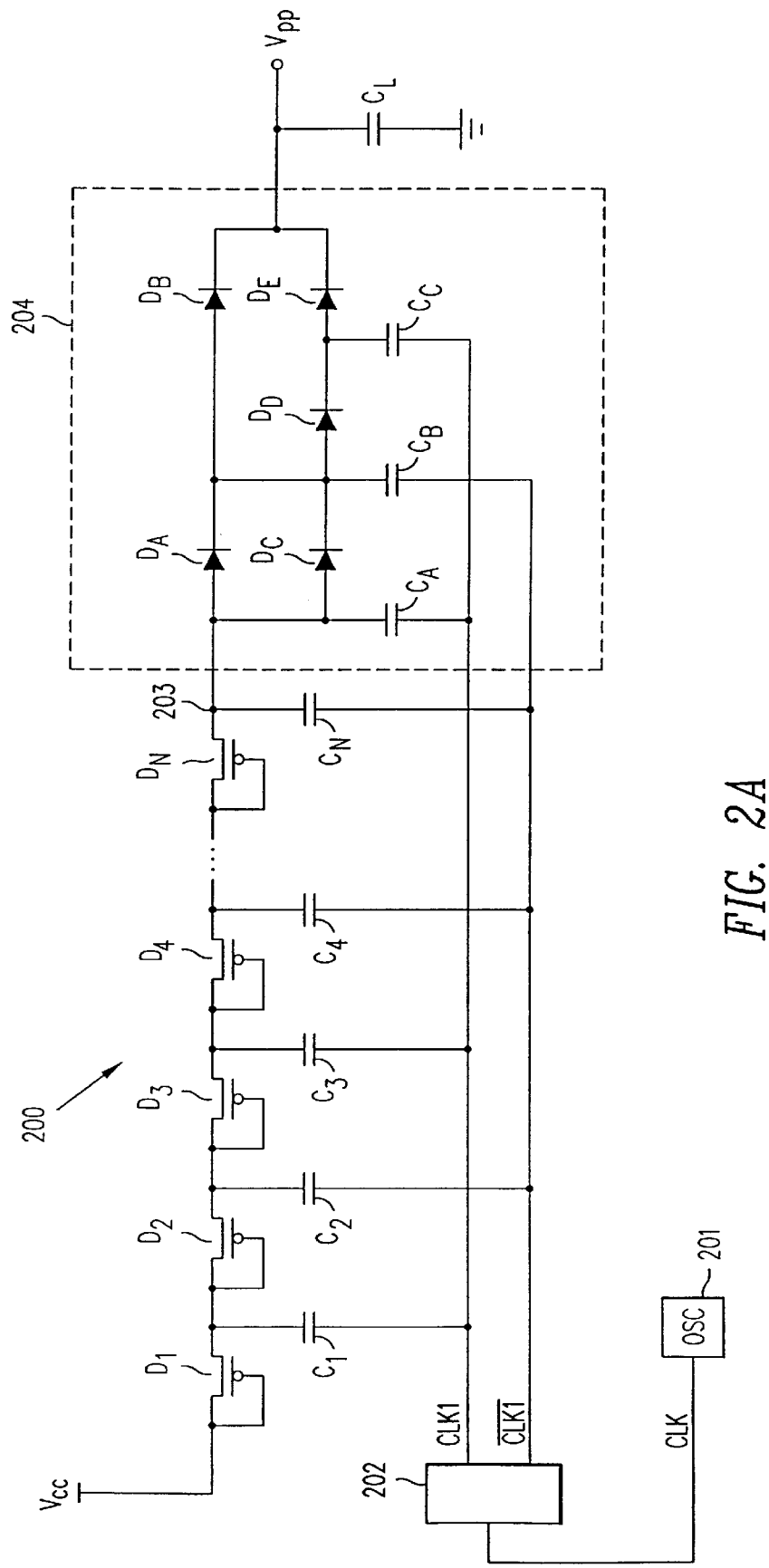
Figure 3A:
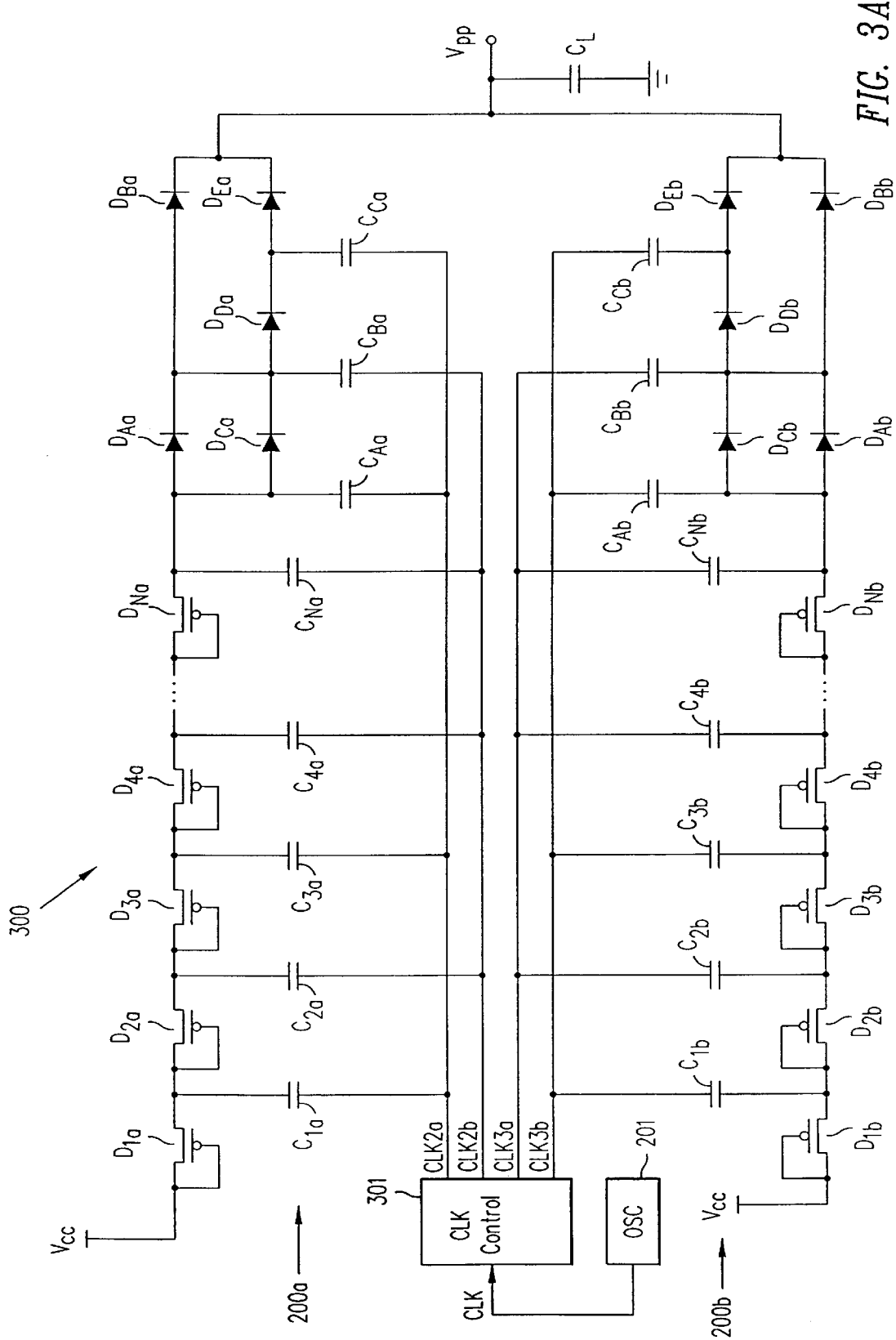
Figure 6:
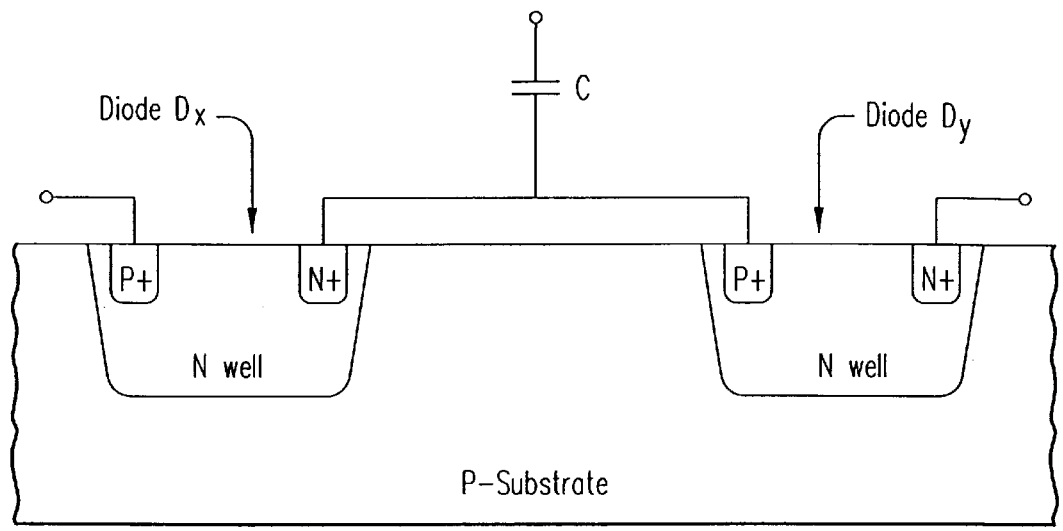
FIGS. 6 and 7 show implementations of diodes employed in embodiments of the present invention.
Figure 7:
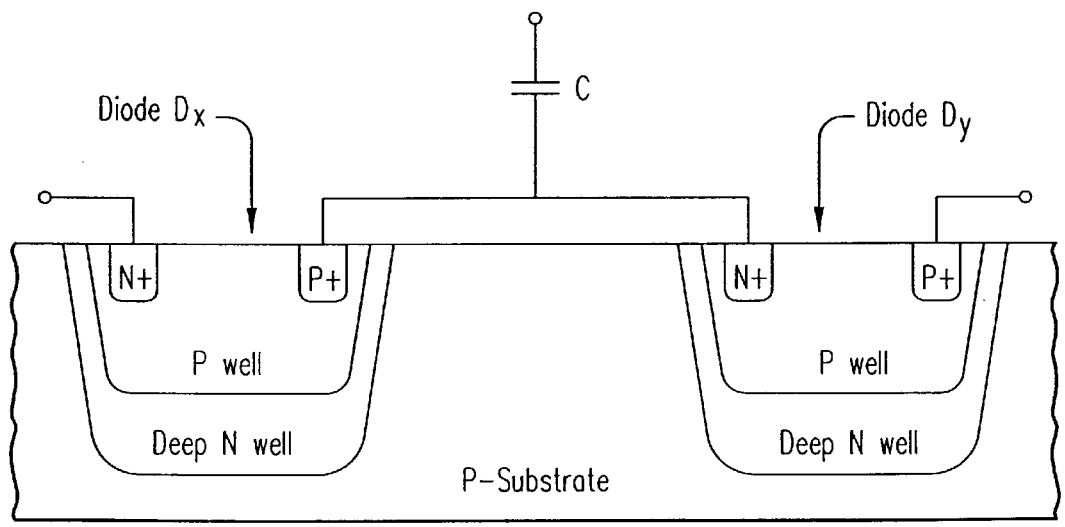

In some embodiments, the diode chains described above may be formed as a chain of diode-connected NMOS transistors, as shown in FIGS. 2A and 3A. While in other embodiments, PMOS transistors (not shown) may be used. In such embodiments, the wells of the diode-connected transistors are coupled to output terminal $V_{PP}$ to prevent body effects from influencing the threshold voltage $V_T$ of the MOS devices. Coupling the wells in such a manner also advantageously prevents any degradation in efficiency resulting from $V_T$ drops between diode-capacitor stages when converting a low $V_{CC}$ voltage to a higher voltage at $V_{PP}$. FIGS. 6 and 7 illustrate two possible implementations of diode chains, where diodes $D_x$ and $D_y$ and capacitor C are representative of the diodes and capacitors of the pump stages discussed above with respect to FIGS. 2 and 3. The embodiment of FIG. 6 utilizes single well technology, where the diodes are P+/N well junction diodes having an N+ cathode contact region and are formed in a P− substrate. The diode chain of FIG. 6 is capable of realizing a positive high voltage charge pump. The embodiment of FIG. 7 utilizes triple well technology, where the diodes are N+/P well junction diodes having a P+ anode contact region and are formed in deep N well regions which, in turn, are formed in a P− substrate. The diode chain of FIG. 7 is advantageous in realizing a negative high voltage charge pump since the $C/(C+C_s)$ ratio (see equation 1) is maximized. It is to be noted that the conductivity types described with reference to and illustrated in FIGS. 6 and 7 may be reversed while still realizing the benefits of the above-described embodiments in accordance with the present invention.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A charge pump circuit comprising:
    a clock control circuit for providing a clock signal and an inverted clock signal, said inverted clock signal being approximately 180 degrees out-of-phase with respect to said clock signal;
    a plurality of voltage multipliers connected in a chain, wherein each of said voltage multipliers comprises a diode connected to a capacitor, and wherein alternate ones of said voltage multipliers are coupled to said clock and inverted clock signals, respectively; and
    an output stage coupled to one of said voltage multipliers for providing current to an output terminal of said charge pump circuit during both low and high transitions of said clock signal.

2. The circuit of claim 1, wherein said output stage comprises first and second substages, said first substage providing current to said output terminal on high transitions of said clock signal, said second substage providing current to said output terminal on high transitions of said inverted clock signal.

3. The circuit of claim 2, wherein said first substage of said output stage further comprises:
    a first diode having a cathode coupled to said output terminal and having an anode; and
    a first capacitor having a first plate coupled to said anode of said first diode and having a second plate coupled to receive said clock signal.

4. The circuit of claim 3, wherein said second substage of said output stage further comprises:
    a second diode coupled between a first node and said output terminal; and
    a second capacitor having a first plate coupled to said first node and having a second plate coupled to receive said inverted clock signal;
    wherein a third diode has an anode coupled to said first node and a cathode coupled to the commonly coupled first plate of said first capacitor and said anode of said first diode.

5. The circuit of claim 4, further comprising:
    a third capacitor having a first plate coupled to one of said diode-capacitor voltage multipliers and having a second plate coupled to receive said clock signal; and
    a fourth diode coupled between said first plate of said third capacitor and said first node.

6. The circuit of claim 5, wherein the last diode-capacitor voltage multiplier is coupled to receive said inverted clock signal.

7. The circuit of claim 2, wherein said diodes comprise diode-connected MOS transistors.

8. The circuit of claim 2, wherein said each of said diodes comprises:
    a P type substrate;
    an N-well formed in said P type substrate; and
    P+ and N+ regions formed in said N-well, said P+ region serving as an anode, said N-well serving as a cathode, and said N+ region serving as a contact for said cathode.

9. The circuit of claim 2, wherein said each of said diodes comprises:
    a P type substrate;
    a deep N-well region formed in said P type substrate;
    a P-well formed in said deep N-well; and
    P+ and N+ regions formed in said P-well, said N+ region serving as a cathode, said P-well serving as an anode, and said P+ region serving as a contact for said anode.

10. The circuit of claim 2, wherein said clock and inverted clock signals have non-overlapping high transitions.

11. A charge pump circuit comprising:
    a clock control circuit for providing a plurality of clock signals and a plurality of inverted clock signals, wherein each of said inverted clock signals is approximately 180 degrees out-of-phase with respect to its associated clock signal;
    a plurality of voltage multiplier circuits, said voltage multiplier circuits each comprising a plurality of voltage multipliers connected in series, wherein each of said voltage multipliers comprises a diode connected to a capacitor, and wherein said capacitors are alternatively coupled to a selected one of said plurality of said clock signals and to an inverted clock signal associated with said selected one of said clock signals; and a plurality of output stages, each coupled to one of said voltage multiplier circuits, for providing substantially equal current to an output terminal of said charge pump circuit during both low and high transitions of said clock signals.

12. The circuit of claim 11, wherein each of said output stages comprises first and second substages, said first substage providing current to said output terminal on high transitions of said clock signal, said second substage providing current to said output terminal on high transitions of said inverted clock signal.

13. The circuit of claim 12, wherein said first substage of said output stage further comprises:

a first diode having a cathode coupled to said output terminal and having an anode; and a first capacitor having a first plate coupled to said anode of said first diode and having a second plate coupled to receive said clock signal.

14. The circuit of claim 13, wherein said second substage of said output stage further comprises:

a second diode coupled between a first node and said output terminal; and a second capacitor having a first plate coupled to said first node and having a second plate coupled to receive said inverted clock signal, wherein a third diode is coupled between said first node and the commonly coupled first plate of said first capacitor and said anode of said first diode.

15. The circuit of claim 14, further comprising:

a third capacitor having a first plate coupled to the last diode-capacitor voltage multiplier and having a second plate coupled to receive said clock signal; and a fourth diode coupled between said first plate of said third capacitor and said first node.

16. The circuit of claim 15, wherein the last diode-capacitor voltage multiplier is coupled to receive said inverted clock signal.

17. The circuit of claim 12, wherein said diodes comprise diode-connected MOS transistors.

18. The circuit of claim 12, wherein said each of said diodes comprises:

a P type substrate;

an N-well formed in said P type substrate; and

P+ and N+ regions formed in said N-well, said P+ region serving as an anode, said N-well serving as a cathode, and said N+ region serving as a contact for said cathode.

19. The circuit of claim 12, wherein said each of said diodes comprises:

a P type substrate;

a deep N-well region formed in said P type substrate;

a P-well formed in said deep N-well; and

P+ and N+ regions formed in said P-well, said N+ region serving as a cathode, said P-well serving as an anode, and said P+ region serving as a contact for said anode.

20. The circuit of claim 12, wherein said clock and inverted clock signals have non-overlapping high transitions.

* * * * *